United States Patent [19]

Iguchi

[11] Patent Number: 6,085,167

[45] Date of Patent: Jul. 4, 2000

[54] ELECTRONIC CASH REGISTER AND RELATED REGISTRATION AND DISPLAY SYSTEM

[75] Inventor: Kesayoshi Iguchi, Fujisawa, Japan

[73] Assignee: Matsushita Electric Industrial Co., Ltd., Japan

[21] Appl. No.: 09/064,097

[22] Filed: Apr. 22, 1998

[30] Foreign Application Priority Data

Jun. 30, 1997 [JP] Japan .................................. 9-173978

[51] Int. Cl.⁷ ........................................................ G06F 17/60
[52] U.S. Cl. ................................................ 705/15; 705/24
[58] Field of Search ......................................... 705/15, 24

[56] References Cited

U.S. PATENT DOCUMENTS 4,843,547  6/1989  Fuyama ....................... 705/24

5,864,824  1/1999  Iguchi ......................... 705/15

FOREIGN PATENT DOCUMENTS 7-296250  11/1995  Japan .

*Primary Examiner*—Harold I. Pitts
*Attorney, Agent, or Firm*—Parkhurst & Wendel, LLP

[57] ABSTRACT

Each item is assigned by a combination of a main code and a sub code. During a registration of ordered items, each ordered item is displayed according to a first classification based on the main code and the sub code. The display screen is changed in response to a depression of a subtotal key or a total key. After the subtotal key or the total key is depressed, the ordered item is displayed according to a second classification based on the main code only.

10 Claims, 13 Drawing Sheets

| H B SET | C B SET | F B SET | | | | SUBTOTAL |
|---|---|---|---|---|---|---|
| SET COFFEE | SET COLA | SET TEA | 7 | 8 | 9 | |
| HAMBURGER | CHEESE BURGER | FISH BURGER | 4 | 5 | 6 | TOTAL |
| COFFEE | COLA | TEA | 1 | 2 | 3 | |
| | | | 0 | 00 | | |

10 ITEM KEYS  11 NUMERICAL KEYS  12 SUBTOTAL  13 TOTAL

FIG. 3

| ITEM NAME | MAIN CODE | SUB CODE | PRICE |
|---|---|---|---|
| HAMBURGER | 1 0 0 0 | 0 0 | 2 0 0 |
| SET HAMBURGER | 1 0 0 0 | 0 1 | 1 5 0 |
| CHEESE BURGER | 1 0 0 1 | 0 0 | 2 1 0 |
| SET CHEESE BURGER | 1 0 0 1 | 0 1 | 1 5 0 |
| FISH BURGER | 1 0 0 2 | 0 0 | 2 2 0 |
| SET FISH BURGER | 1 0 0 2 | 0 1 | 1 5 0 |
| COFFEE | 2 0 0 0 | 0 0 | 1 8 0 |
| SET COFFEE | 2 0 0 0 | 0 1 | 1 2 0 |
| COLA | 2 0 0 1 | 0 0 | 1 8 0 |
| SET COLA | 2 0 0 1 | 0 1 | 1 2 0 |
| TEA | 2 0 0 2 | 0 0 | 1 8 0 |
| SET TEA | 2 0 0 2 | 0 1 | 1 2 0 |
| FRIED POTATO | 3 0 0 0 | 0 0 | 1 5 0 |
| SET FRIED POTATO | 3 0 0 0 | 0 1 | 1 2 0 |

NUMBER ORDERED

| | |
|---|---|
| 2 | H B SET |
| 2 | SET HAMBURGER |
| 1 | HAMBURGER |
| 2 | SET FRIED POTATO |
| 1 | SET COLA |
| 1 | SET COFFEE |
| 1 | COLA |

FIG. 6

NUMBER ORDERED

| | | | |
|---|---|---|---|
| 2 | H B SET | SUBTOTAL | 1,160 |
| 3 | HAMBURGER | TAX | 58 |
| 2 | FRIED POTATO | TOTAL | 1,218 |
| 2 | COLA | | |
| 1 | COFFEE | | |

| H B SET | C B SET | F B SET | 7 | 8 | 9 | CORRECT ← 24 |
|---|---|---|---|---|---|---|
| SET COFFEE | SET COLA | SET TEA | 4 | 5 | 6 | SUBTOTAL ← 12 |
| HAMBURGER | CHEESE BURGER | FISH BURGER | 1 | 2 | 3 | |
| COFFEE | COLA | TEA | 0 | 0 0 | | TOTAL ← 13 |

| H B SET | C B SET | F B SET | | | | SUBTOTAL — 12 |
|---|---|---|---|---|---|---|
| SET COFFEE | SET COLA | SET TEA | 7 | 8 | 9 | |
| HAMBURGER | CHEESE BURGER | FISH BURGER | 4 | 5 | 6 | |
| COFFEE | COLA | TEA | 1 | 2 | 3 | |
| | | | 0 | 00 | | STORE — 34 |

| H B SET | C B SET | F B. SET | | | | RECALL | 35 |
|---|---|---|---|---|---|---|---|
| SET COFFEE | SET COLA | SET TEA | 7 | 8 | 9 | | |
| HAMBURGER | CHEESE BURGER | FISH BURGER | 4 | 5 | 6 | | |
| COFFEE | COLA | TEA | 1 | 2 | 3 | | |
| | | | 0 | 0 0 | | TOTAL | 13 |

FIG. 13

| #15 | #16 ← ORDER NUMBER | #17 |
|---|---|---|
| 2  H B SET | 2  C B SET | 3  CHEESE BURGER |
| 1  HAMBURGER | 1  SOUP | 1  COLA |
| 1  COFFEE | 1  HOT TEA | 1  COFFEE |
| 2  COLA | | |

FIG. 14

| SET ITEM NAME | SET CODE | 1ST ARRANGE CODE | 2ND ARRANGE CODE |
|---|---|---|---|
| H B SET | 9 2 0 0 : 0 0 | 1 0 0 0 : 0 1 | 3 0 0 0 : 0 1 |
| C B SET | 9 3 0 0 : 0 0 | 1 0 0 1 : 0 1 | 3 0 0 0 : 0 1 |
| F B SET | 9 3 1 0 : 0 0 | 1 0 0 2 : 0 1 | 3 0 0 0 : 0 1 |

ELECTRONIC CASH REGISTER AND RELATED REGISTRATION AND DISPLAY SYSTEM

BACKGROUND OF THE INVENTION

The present invention relates to an electronic cash register and a related registration and display system.

Electric cash registers are widely used, for example, in fast food shops or restaurants. Many of the fast food shops and restaurants provide a variety of choices on a menu to satisfy various requirements from customers. To this end, there is a possibility that a same item (e.g. a hamburger) may be served as a single item or part of a set item (e.g., a hamburger set) according to a customer's preference.

SUMMARY OF THE INVENTION

An object of the present invention is to provide an electronic cash register which is easy to handle in order taking and/or cashier procedures and is capable of eliminating errors in registration and preparation for the ordered items.

Another object of the present invention is to provide a registration and display system relating to the electronic cash register.

In order to accomplish the above and other related objects, a first aspect of the present invention provides an electronic cash register comprising a storing means for storing an item setting table setting a main code and a sub code for each item, a judging means for judging a content of a registration procedure, and a display means for selecting a display screen according to the content of the registration procedure judged by the judging means.

Preferably, the judging means judges the content of the registration procedure by checking an entry of a key operation for totaling registered items. The key operation for totaling the registered items may be a depression of a subtotal key or a total key.

Preferably, the display means has a first display screen displaying ordered items according to a first classification based on both the main code and the sub code and a second display screen displaying the ordered items according to a second classification based on the main code only. The display means can select the first display screen during a registration procedure of the ordered items and selects the second display screen in response to a key operation for totaling registered items.

A second aspect of the present invention provides an electronic cash register comprising a storing means for storing an item setting table setting a main code and a sub code for each item, a judging means for judging a content of a registration procedure, a correcting means for correcting a registered item; and a display means for selecting a display screen according to the content of the registration procedure judged by the judging means and in response to a correction performed by the correcting means.

Preferably, the judging means judges the content of the registration procedure by checking an entry of a key operation for totaling registered items. The key operation for totaling the registered items may be a depression of a subtotal key or a total key.

Preferably, the display means has a first display screen displaying ordered items according to a first classification based on both the main code and the sub code and a second display screen displaying the ordered items according to a second classification based on the main code only. The display means selects the first display screen during a registration procedure of the ordered items and selects the second display screen in response to a key operation for totaling registered items. The display means selects the first display screen when the correction is performed by the correcting means.

A third aspect of the present invention provides an electronic cash registration system comprising a first register dedicated to an order taking procedure and using a first display screen displaying ordered items according to a first classification, a second register dedicated to a cashier's procedure and using a second display screen displaying the ordered items according to a second classification different from the first classification, and a communication means for transmitting data between the first register and the second register.

Preferably, the electronic cash registration system further comprises a storing means for storing an item setting table setting a main code and a sub code for each item. The first display screen displays the ordered items according to a classification based on both the main code and the sub code, and the second display screen displays the ordered items according to another classification based on the main code only.

A fourth aspect of the present invention provides an electronic cash register comprising a first storing means for storing a single item setting table setting a main code and a sub code for each single item, a second storing means for storing a set item setting table setting a set code for each set item, a judging means for judging a content of each order; and a display means for selecting a display screen according to the content of each order judged by the judging means.

Preferably, the display means uses a first display screen displaying an ordered item according to both the main code and the sub code when the ordered item is a single item and uses a second display screen displaying the ordered item according to the set code when the ordered item is a set item.

Furthermore, the present invention provides a display method for the electronic cash register. Each registered item is displayed using a first display screen during a registration procedure of each ordered item. The first display screen displays the registered item according to a first classification based on both a main code and a sub code. Then, in response to an entry of a key operation for totaling registered items, the first display screen is changed to a second display screen. The second display screen displays the registered item according to a second classification based on the main code only.

Preferably, the second display screen is returned to the first display screen in response to an entry of a key operation for correcting the registered item.

Moreover, according to another display method of the present invention, an order number of each registered item is displayed. It is checked whether the registered item is a single item or a set item. The registered item is displayed according to a first code when the registered item is the single item. The registered item is displayed according to a second code when the registered item is the set item.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained in more detail with reference to FIGS. 1 through 15. Identical parts are denoted by the same reference numerals throughout the drawings.

Figure 1:
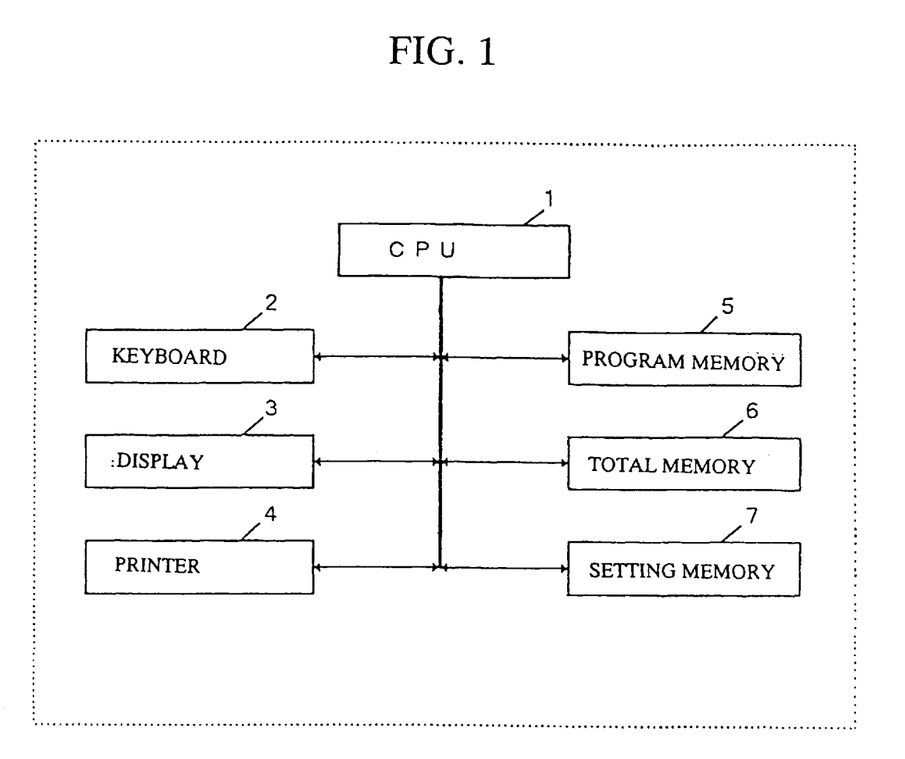
FIG. 1 is a block diagram showing a schematic arrangement of an electronic cash register in accordance with the present invention.

FIG. 1 is a block diagram showing an electronic cash register of the present invention. The electronic cash register comprises a CPU 1, a keyboard 2, a display 3, a printer 4, a program memory 5, a total memory 6, and a setting memory 7. The CPU 1 performs various calculations and controls input and output data. The keyboard 2 allows an operator to register the ordered items and enter amounts of money. The display 3 has a display screen for indicating registered contents to the operator. The printer 4 prints a receipt or report to be forwarded to a customer. The program memory 5 memorizes various equations used in the calculations and other related controls performed in the electronic cash register. The total memory 6 memorizes sales amounts and the number of sold items. The setting memory 7 memorizes item names and prices.

First Embodiment

Figure 2:
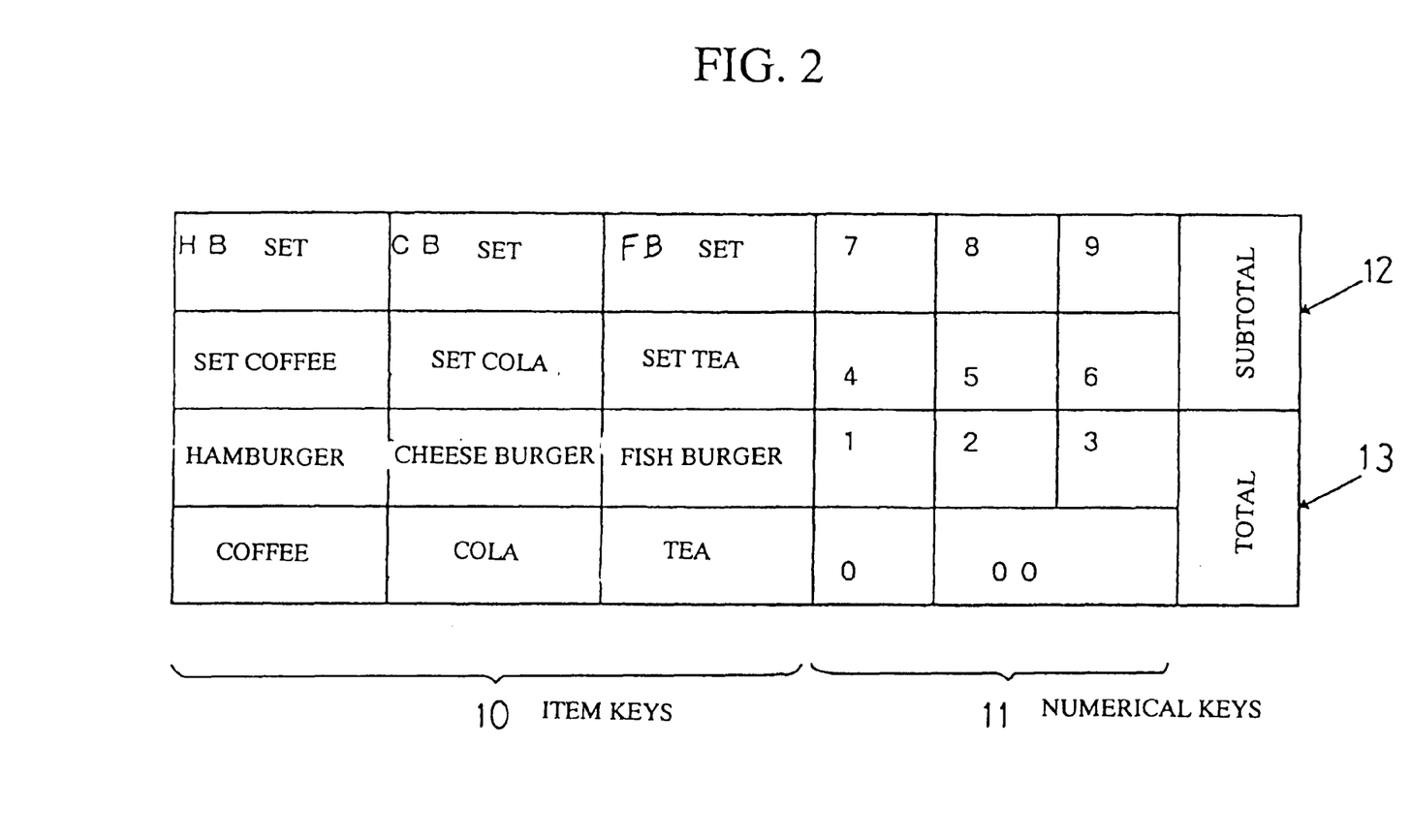
FIG. 2 is a view showing a keyboard arrangement of the electronic cash register in accordance with a first embodiment of the present invention.

FIG. 2 is a view showing a key arrangement for the keyboard 2 of the electronic cash register. This keyboard arrangement comprises a predetermined number of item keys 10, numerical keys 11, a subtotal key 12 and a total key 13. The item keys 10 allow an operator to register each item according to customer's order by pushing a corresponding key. There are a total of twelve item keys 10, corresponding to six set items of "HB (hamburger) set", "CB (cheese burger) set", "FB (fish burger) set", "set coffee", "set cola" and "set tea" and six single items of "hamburger", "cheese burger", "fish burger", "coffee","cola" and "tea."

Figure 3:
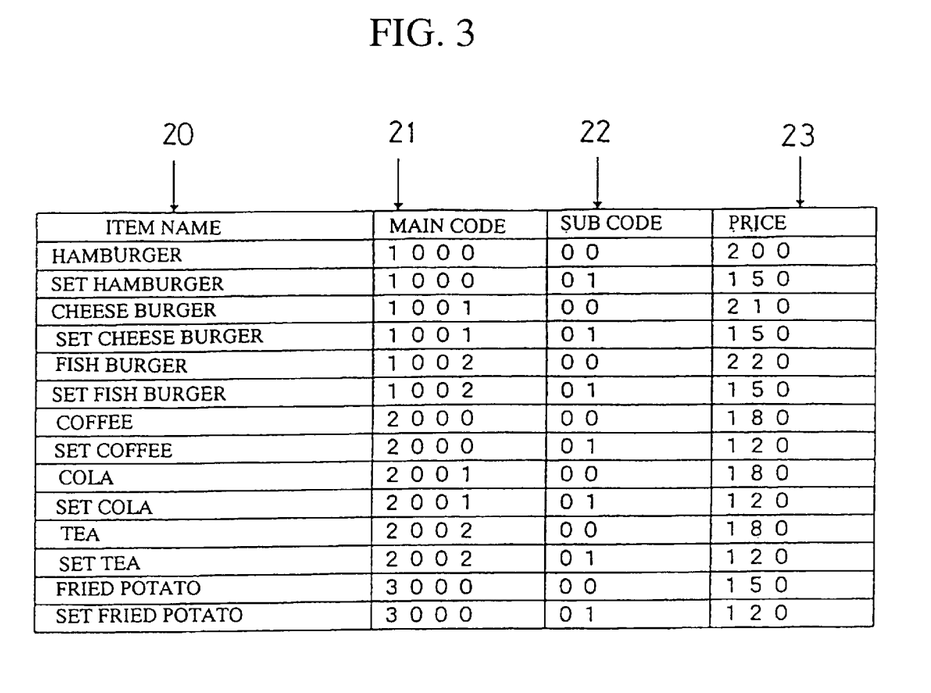
FIG. 3 is an item setting table in accordance with a first embodiment of the present invention.

FIG. 3 shows an example of an item setting table in accordance with a first embodiment of the present invention. As shown in FIG. 3, the item setting table includes an item name 20, a main code 21, a sub code 22 and a price 23. The item name 20 represents the name of each item which is displayed on the display screen or printed on a receipt. The main code 21 is an identification code assigned to the same items. The sub code 22 represents the attribution of each item. The price 23 represents a sales price for each item determined according to its attribution.

According to the item setting of the first embodiment, all of hamburgers are given the same main code "1000." However, the sub code assigned to each hamburger is varied depending on the way of sales. When a hamburger is sold as a single item, its sub code is "00." On the other hand, a hamburger sold as part of a set menu is given a sub code "01." Thus, the price of each hamburger is differentiated according to the sub code.

It is now assumed that a customer ordered two HB sets from the set items together with a "cola" and a "hamburger" from the single items. The "HB set" includes a hamburger, a fried potato and a favorite drink. The customer selected one cola (set cola) and one coffee (set coffee) as the favorite drinks.

Figure 4:
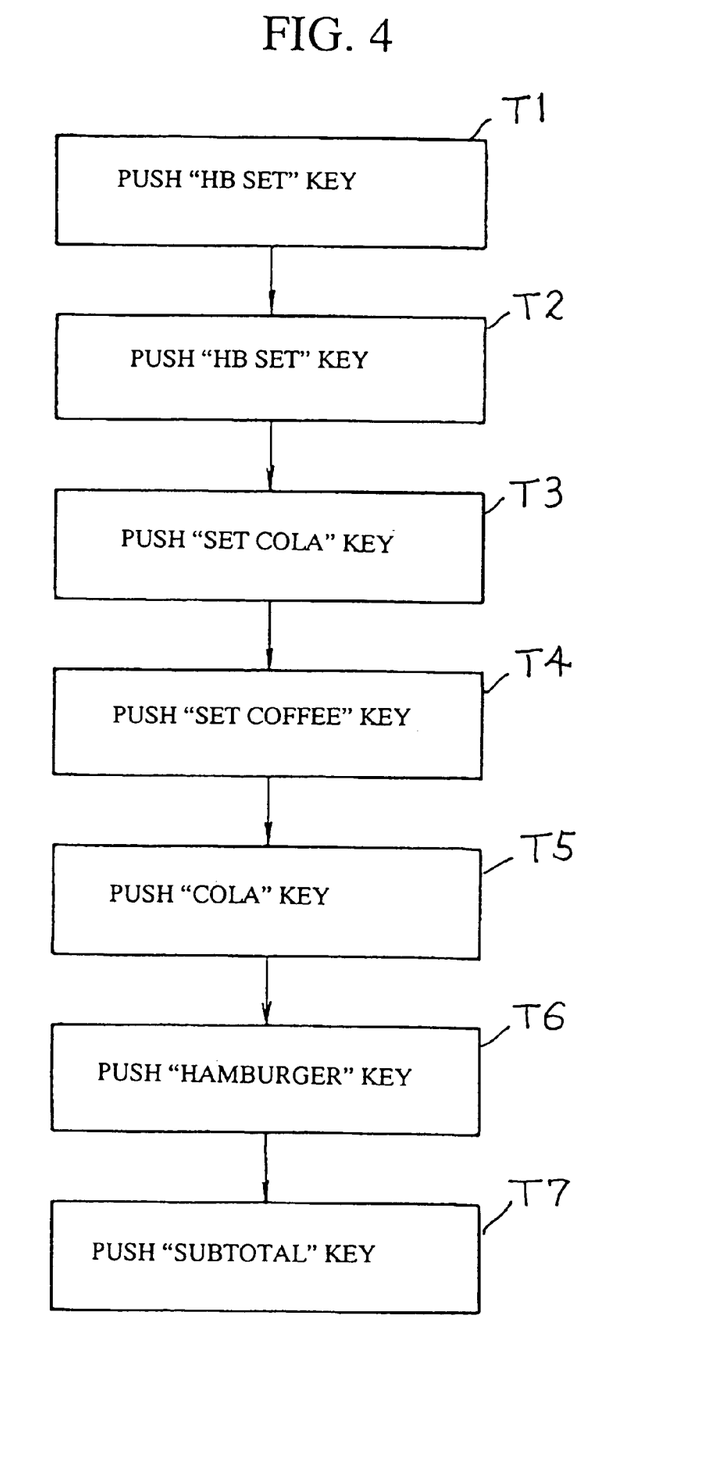
FIG. 4 is a flowchart showing a key operation in accordance with the first embodiment of the present invention.

FIG. 4 shows an example of key operation performed by the operator according to the order from the customer. The operator successively depresses the "HB set" key twice (steps T1 and T2), the "set cola" key once (step T3), the "set coffee" key once (step T4), the "cola" key once (step T5), the "hamburger" key once (step T6), and the "subtotal" key once (step 17).

Figure 5:
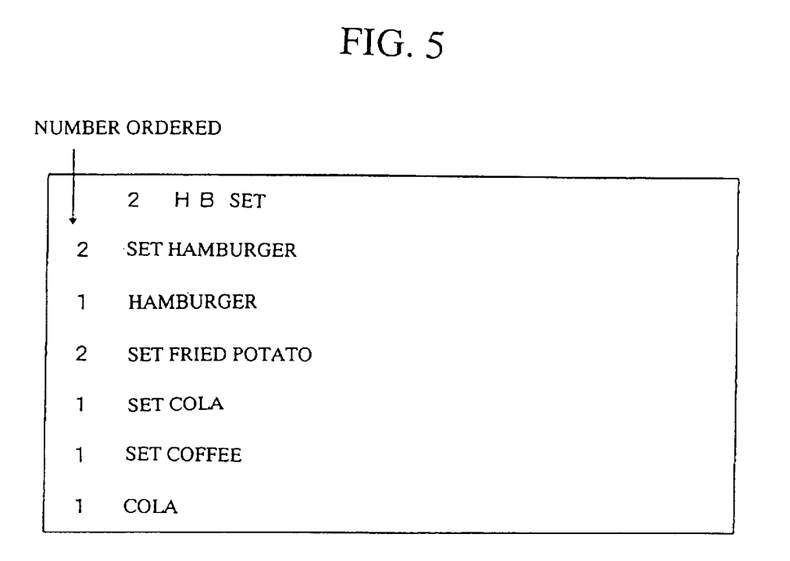
FIG. 5 is a display screen shown after items are registered in accordance with the first embodiment of the present invention.

FIG. 5 is a display screen shown after all items are registered (i.e., immediately after the step T6 shown in the flowchart of FIG. 4). The display screen of FIG. 5 indicates details of the customer's order. This facilitates the confirmation of the order.

Figure 6:
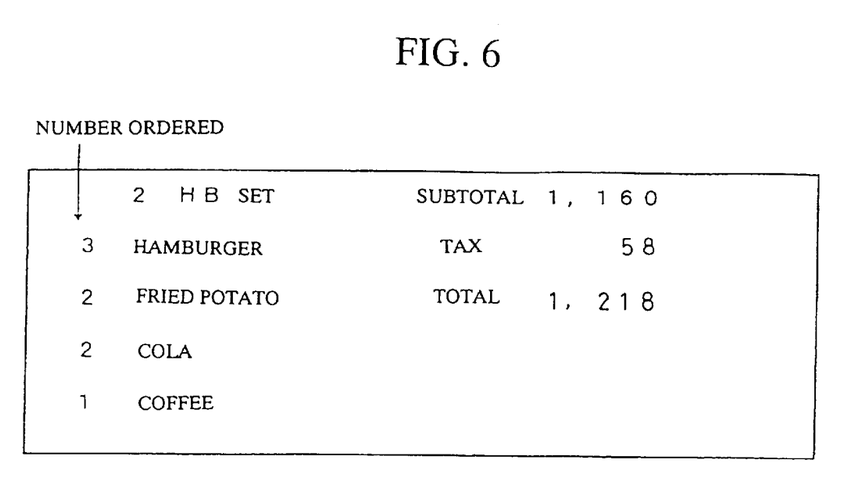
FIG. 6 is a display screen shown after a subtotal key is operated in accordance with the first embodiment of the present invention.

FIG. 6 is a display screen shown after the subtotal key 12 or the total key 13 is depressed (i.e., immediately after the step 17 shown in the flowchart of FIG. 4). The display screen of FIG. 6 indicates a total number of each ordered item. This is easy for the operator to know the required number of the ordered items to be prepared. For example, the display screen of FIG. 6 indicates a total of three hamburgers, i.e., two hamburgers for the two "HB set" orders and one hamburger for the single "hamburger" order.

Figure 7:
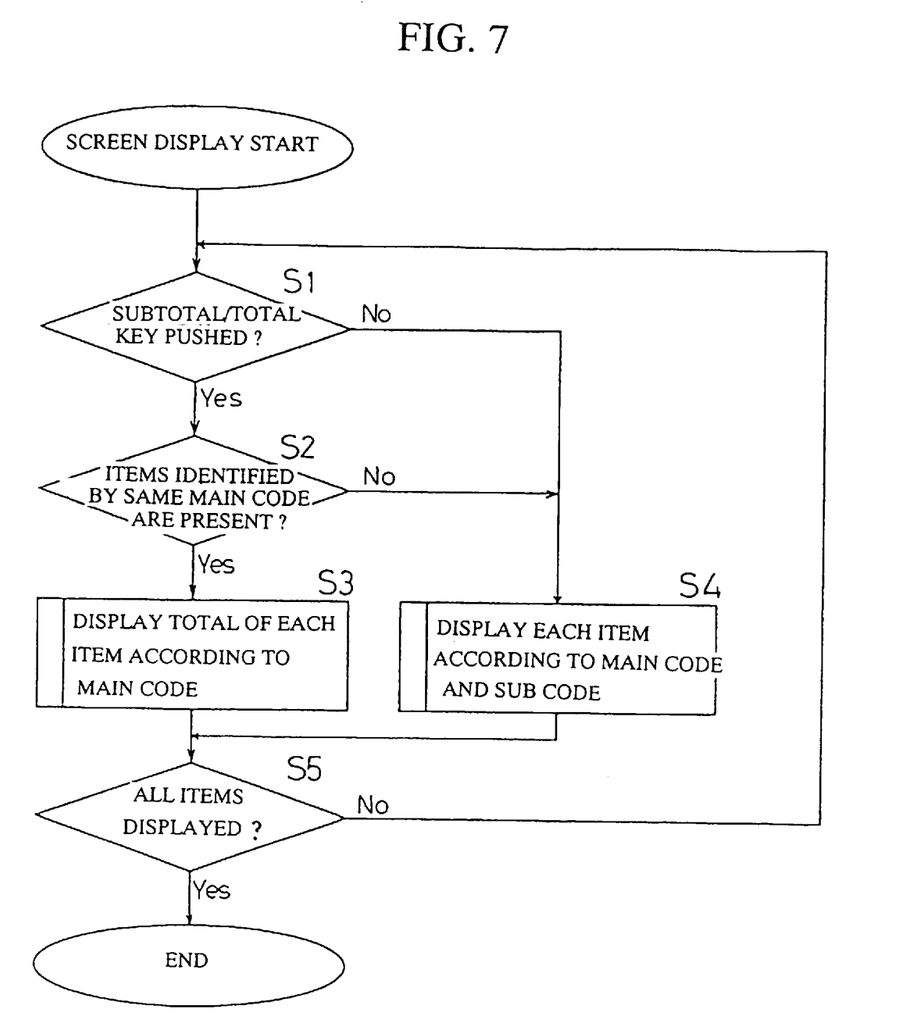
FIG. 7 is a flowchart showing a screen display routine performed by the electronic cash register in accordance with the first embodiment of the present invention.

FIG. 7 is a flowchart showing a screen display routine performed by the electronic cash register in accordance with the first embodiment. In step S1, it is checked whether the subtotal key 12 or the total key 13 is depressed. If the subtotal key 12 or the total key 13 is depressed (i.e., YES in step S1), the control flow proceeds to a step S2. In the step S2, it is further checked whether items having the same main code 21 are present. If there are any items identified by the identical main code 21, the control flow proceeds to a step S3. In step S3, a total number of the same items having the identical main code 21 are counted. The common name corresponding to the main code 21 is displayed together with its total number on the display screen, as shown in FIG. 6. For example, in the item name 20 of FIG. 3, the hamburgers are classified into two categories of "hamburger" and "set hamburger." However, in the display operation performed in the step S3, the common name corresponding to the main code "1000" is "hamburger." Thus, the total number "3" is attached on the head of "hamburger" as shown in the display screen of FIG. 6.

When the subtotal key 12 or the total key 13 is not depressed (i.e., NO in step S1) or when the items having the same main code 21 are not present (i.e., NO in step S2), the control flow proceeds to a step S4. In step S4, a total number of the items identical in both of the main code 21 and the sub code 22 are counted. The item name 20 identified by the combination of the main code 21 and the sub code 22 is displayed together with its total number on the display screen, as shown in FIG. 5. Finally, in step S5, it is checked whether all ordered items are displayed. If the registration (i.e., display operation) of all ordered items is completed, the screen display routine is finished. If there is any ordered item not displayed, the control flow returns to the step S1 to repeat the above-described procedure.

In this manner, the first embodiment of the present invention provides the item setting table that assigns the main code 21 and the sub code 22 to each item. This makes it possible that the prices 23 for the same items having the same main code 21 are differentiated according to the attribution, i.e., single item or set item, identified by the sub code 22. The display screen is changeable adequately in accordance with each stage of the registration procedure.

More specifically, during the registration of the ordered items, the ordered items are displayed according to the classification based on both the main code 21 and the sub code 22. This display is effective to eliminate errors during the registration of the ordered items.

On the other hand, after the subtotal key 12 or the total key 13 is depressed, the ordered items are displayed differently according to the classification based on only the main code 21. This is effective to facilitate the preparation for the ordered items performed by the operator. Accordingly, it becomes possible to significantly reduce the time required for taking an order and preparing the ordered items. Furthermore, these operations can be done accurately.

Moreover, allocating the same main code 21 to the same items regardless of its attribution (set item sales or single item sales) is effective for facilitating the stock administration.

Second Embodiment

Figure 8:
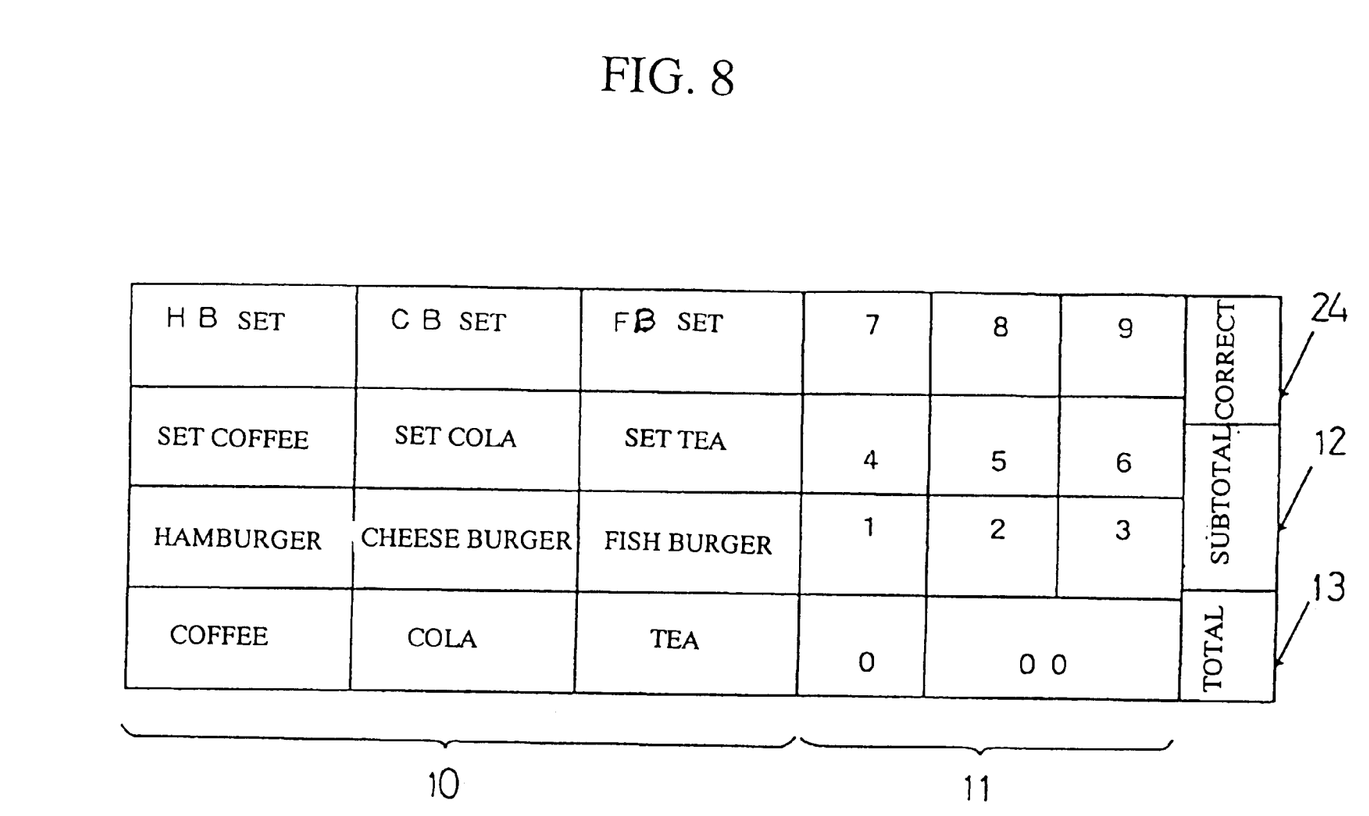
FIG. 8 is a view showing a keyboard arrangement of the electronic cash register in accordance with a second embodiment of the present invention.

FIG. 8 shows a keyboard arrangement of the electronic cash register in accordance with a second embodiment of the present invention. The keyboard arrangement of the second embodiment includes a correction key 24. The rest of the keyboard arrangement is substantially identical with those disclosed in FIG. 2 of the first embodiment.

Figure 9:
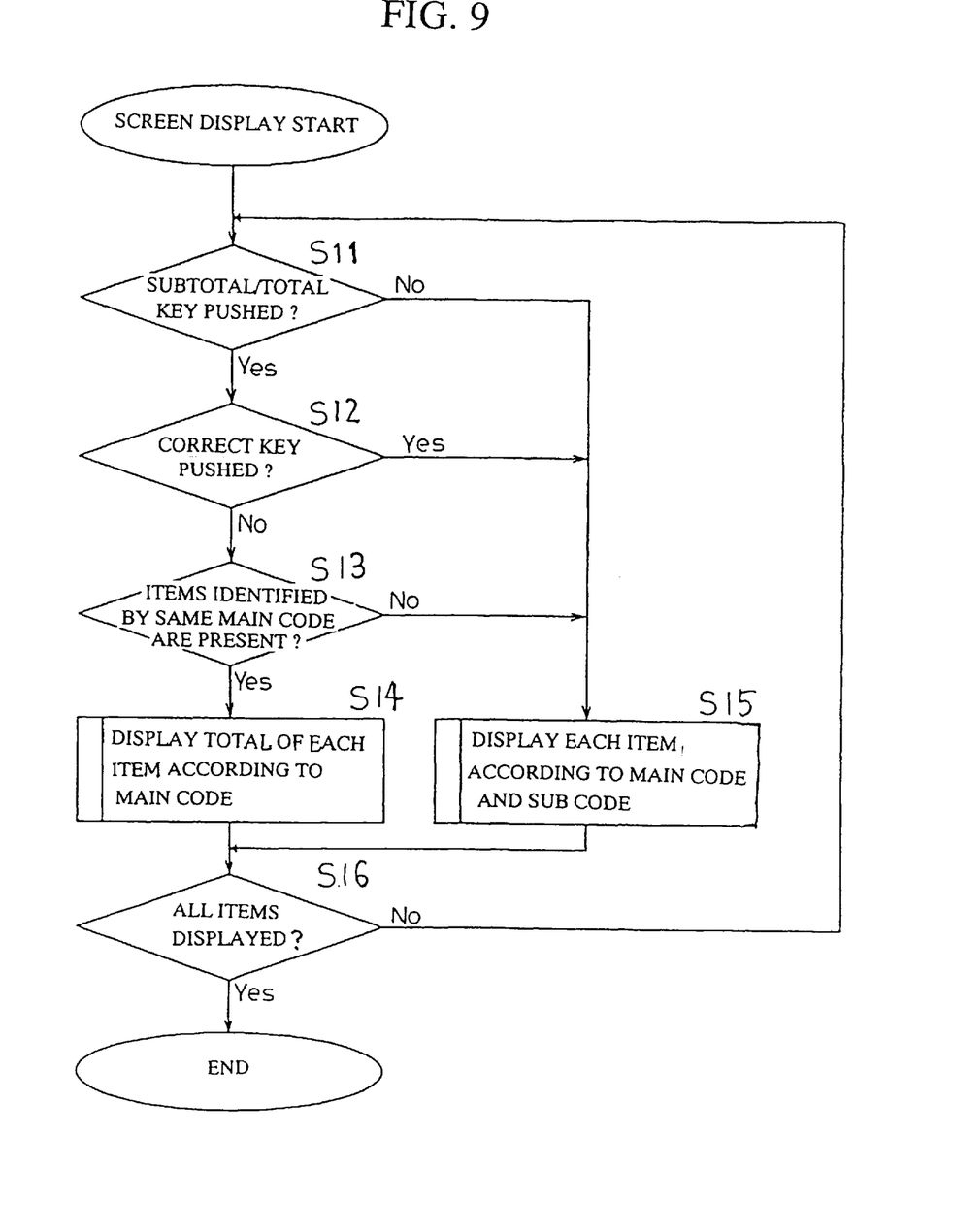
FIG. 9 is a flowchart showing a screen display routine performed by the electronic cash register in accordance with the second embodiment of the present invention.

FIG. 9 is a flowchart showing a screen display routine performed by the electronic cash register in accordance with the second embodiment. In step S11, it is checked whether the subtotal key 12 or the total key 13 is depressed. If the subtotal key 12 or the total key 13 is depressed (i.e., YES in step S11), the control flow proceeds to a step S12. In the step S12, it is further checked whether the correction key 24 is depressed. If the correction key 24 is depressed (i.e., YES in step S12), the control flows proceeds to a step S13. In the step S13, it is further checked whether items having the same main code 21 are present. If there are any items identified by the identical main code 21, the control flow proceeds to a step S14. In step S14, a total number of the same items having the identical main code 21 are counted. The common name corresponding to the main code 21 is displayed together with its total number on the display screen, as shown in FIG. 6. When both of the subtotal key 12 and the total key 13 are not depressed (i.e., NO in step S12) or when the correction key 24 is not depressed (i.e., NO is step S12), or when the items having the same main code 21 are not present (i.e., NO in step S13), the control flow proceeds to a step S15. In step S15, a total number of the items identical in both the main code 21 and the sub code 22 are counted. The item name 20 identified by both the main code 21 and the sub code 22 is displayed together with its total number on the display screen, as shown in FIG. 5. Finally, in step S16, it is checked whether all items are displayed. If the registration (i.e., display operation) of all ordered items is completed, the screen display routine is finished. If there is any item not registered, the control flow returns to the step S11 to repeat the above-described procedure.

In the same manner as the first embodiment, the second embodiment of the present invention provides an item setting table that assigns the main code 21 and the sub code 22 to each item. The display screen is selected adequately in accordance with the stage of the registration procedure. More specifically, during the registration of the ordered items, the ordered items are displayed according to the classification based on both the main code 21 and the sub code 22. On the other hand, after the subtotal key or the total key is depressed, the ordered items are displayed according to the classification based on only the main code 21.

Especially, the second embodiment provides an adequate display in response to any correction of the registration, even after the subtotal key or the total key is depressed,. More specifically, every time the correction key 24 is depressed, the ordered items are displayed according to the classification based on both the main code 21 and the sub code 22. This is effective to eliminate errors in the correction of the ordered items.

Third Embodiment

Figure 10:
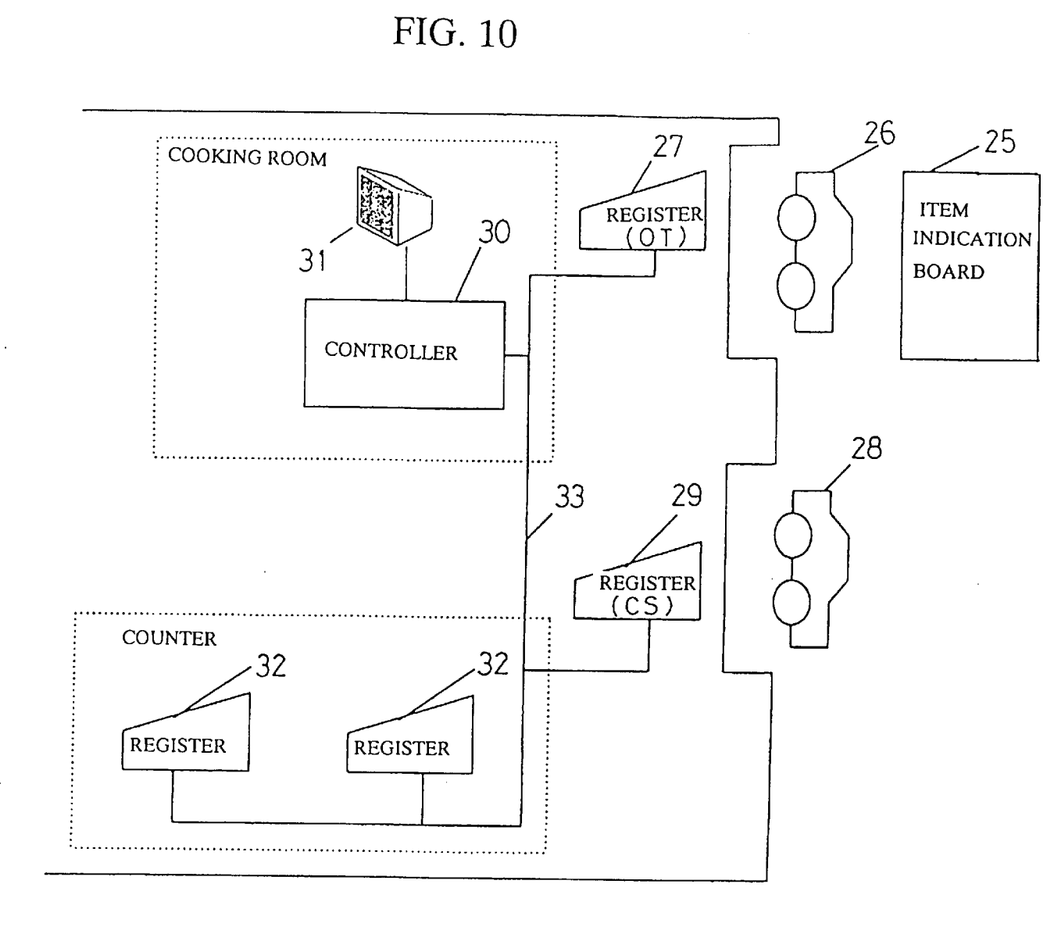
FIG. 10 is a schematic view showing a drive-through shop system in accordance with a third embodiment of the present invention.

FIG. 10 is a schematic view showing a drive-through shop system in accordance with a third embodiment of the present invention. An item indication board 25 is provided near an incoming vehicle 26 arrived at a predetermined position facing to an OT (order taker's) register 27 provided in a drive-through booth so as to allow an operator of the shop to take an order from a customer in the vehicle 26. Another vehicle 28 is ahead of the vehicle 26 to stop at a CS (cashier station's) register 29 provided in the drive-through booth so as to allow the customer in the vehicle 28 to pay money for the ordered items. A controller 30 is provided to control a drive-through monitor 31 located in a cooking room. Another registers 32 are provided in a counter. The controller 30 is connected to all of the registers 27, 29 and 32 via a communication line 33.

Figure 11:
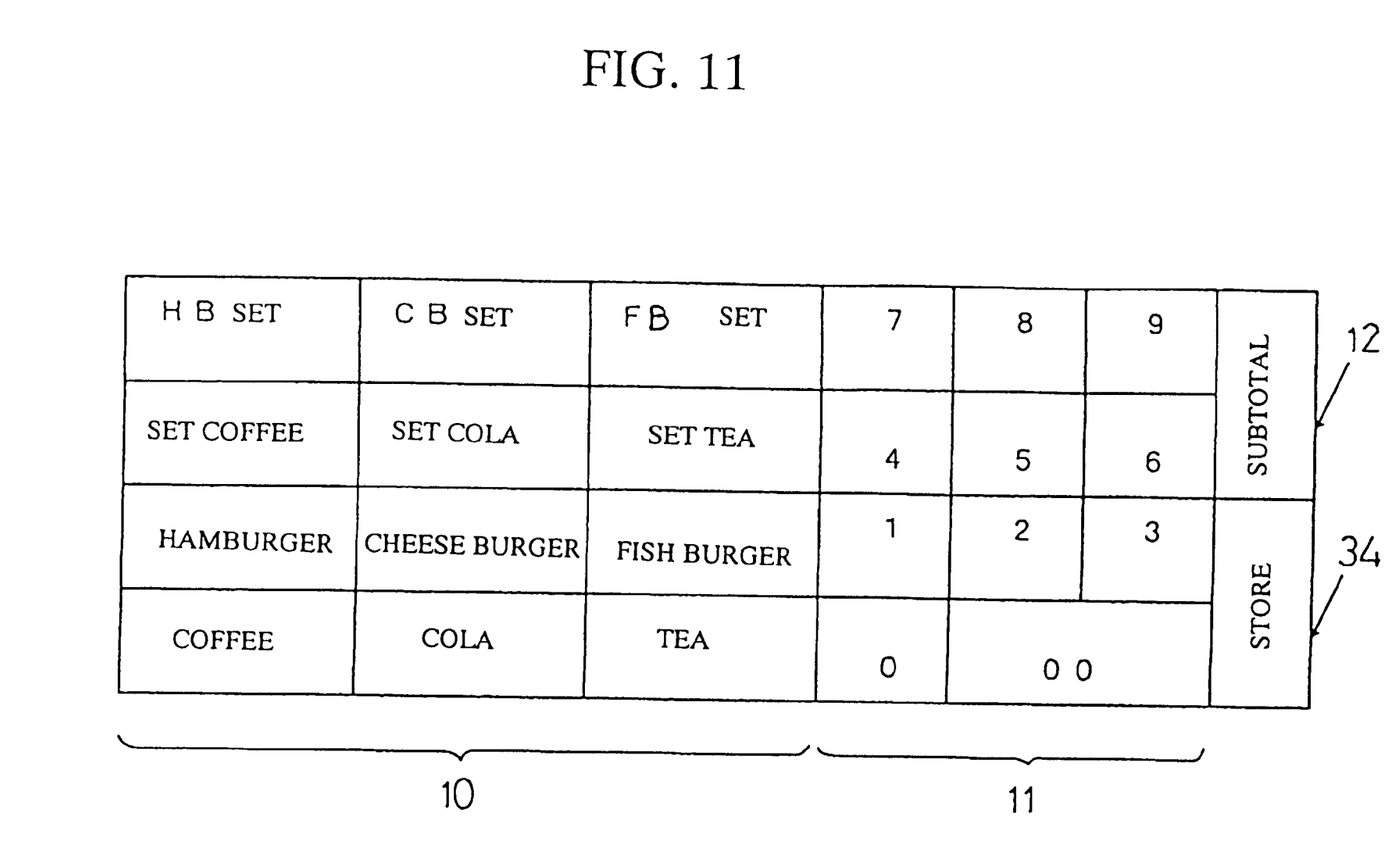
FIG. 11 is a view showing a keyboard arrangement of an order taker's register in accordance with the third embodiment of the present invention.

FIG. 11 shows a keyboard arrangement for the OT register 27 in accordance with the third embodiment of the present invention. The keyboard arrangement shown in FIG. 11 differs from the keyboard arrangement shown in FIG. 2 in that the total key 13 is replaced by a store key 34. The store key 34 allows the order taker to send the taken order data to the controller 30.

Figure 12:
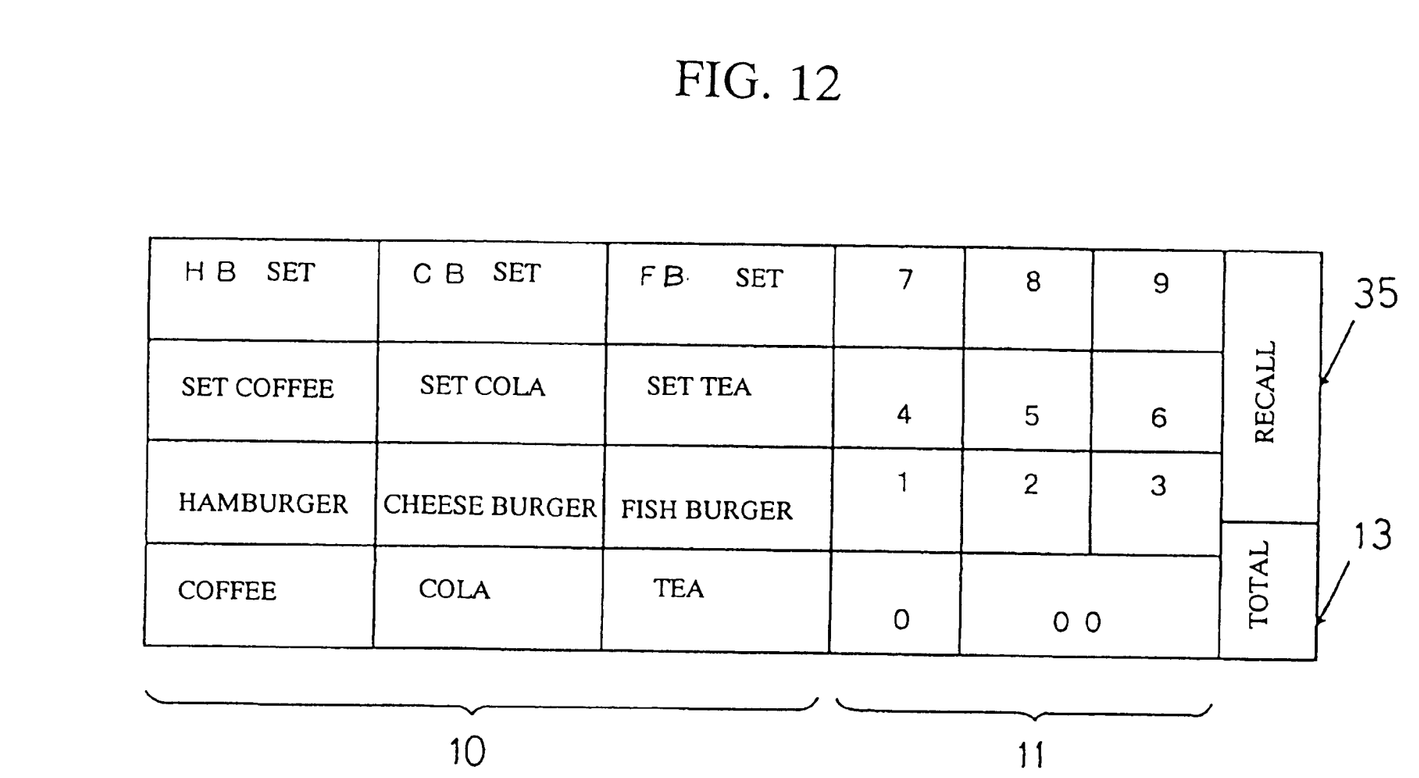
FIG. 12 is a view showing a keyboard arrangement of a cashier station's register in accordance with the third embodiment of the present invention.

FIG. 12 shows a keyboard arrangement for the CS register 29 in accordance with the third embodiment of the present invention. The keyboard arrangement shown in FIG. 12 differs from the keyboard arrangement shown in FIG. 2 in that the subtotal key 12 is replaced by a recall key 35. The recall key 35 allows the cashier to recall the stored order data from the controller 30.

Operation of the third embodiment will be explained hereinafter. The customer in the vehicle 26 places an order for favorite ones from the listed items on the item indication board 25. The operator (i.e., order taker) registers the ordered items into the OT register 27. The data of the ordered items are sent from the OT register 27 to the controller 30 via the communication line 33. After finishing the order placing procedure, the customer advances his/her vehicle forward to the position indicated by the numeral 28. The OT register 27 is dedicated to the order taking procedure. Therefore, the display screen of FIG. 5 is used as a fixed display screen for the OT register 27. Namely, even after the subtotal key 12 is depressed, the registered items are displayed according to the classification based on both the main code 21 and the sub code 22. This is effective to facilitate the confirmation of the taken order.

The operator of OT register 27 depresses the store key 34 to notify the completion of the order taking procedure to the controller 30. In other words, the order of one customer is discriminated from the order of a succeeding customer by depressing the store key 34.

Next, the cashier depresses the recall key 35 of the CS register 29 to recall the stored order data from the controller 30 via the communication line 33. Then, the cashier depresses the total key 13 to display the amount of money to be charged to the customer. The prepared items are given to the customer in exchange for the money. The CS register 29 is dedicated to the cashier's procedure. Therefore, the display screen of FIG. 6 is used as a fixed display screen for the CS register 29. The display screen of FIG. 6 is easy for the cashier to prepare the ordered items and confirm the total number of each ordered item.

The register 32 is operated by a same operator in the counter who acts as an order taker as well as a cashier. No data relating to each taken order are sent to the controller 30. The display performed for the register 32 is the same as that explained in the first embodiment with reference to FIG. 7.

In the same manner as the first embodiment, the third embodiment of the present invention provides an item setting table that assigns the main codes 21 and the sub code 22 to each item. The OT register 27 is provided as a register dedicated to the order taking procedure. The CS register 29 is provided as another register dedicated to the cashier's procedure. The OT register 27 displays the ordered items according to the classification based on both the main code 21 and the sub code 22. The CS register 29 displays the ordered items according to another classification based on only the main code 21. Namely, the third embodiment of the present invention provides an appropriate display screen according to the function of each register in the registration system. This is effective to eliminate errors in the discrimination of the ordered items and to reduce the time required for taking an order and preparing the ordered items.

Fourth Embodiment

Figure 13:
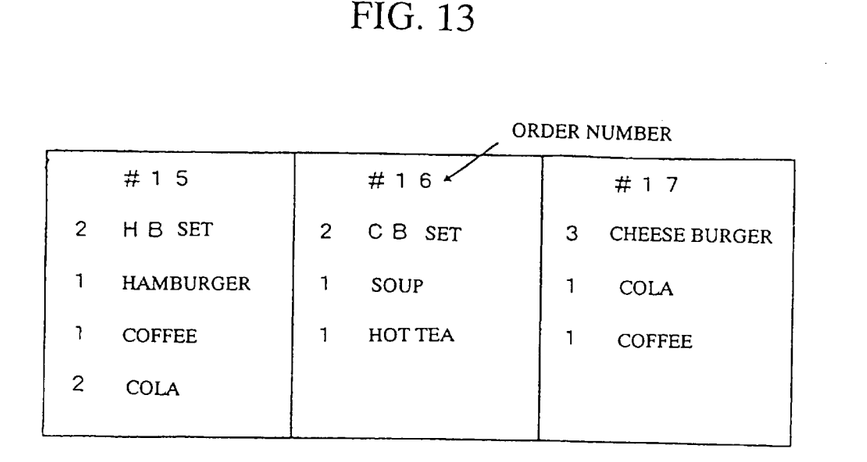
FIG. 13 is a view showing a display screen for a drive-through monitor in accordance with a fourth embodiment of the present invention.
Figure 14:
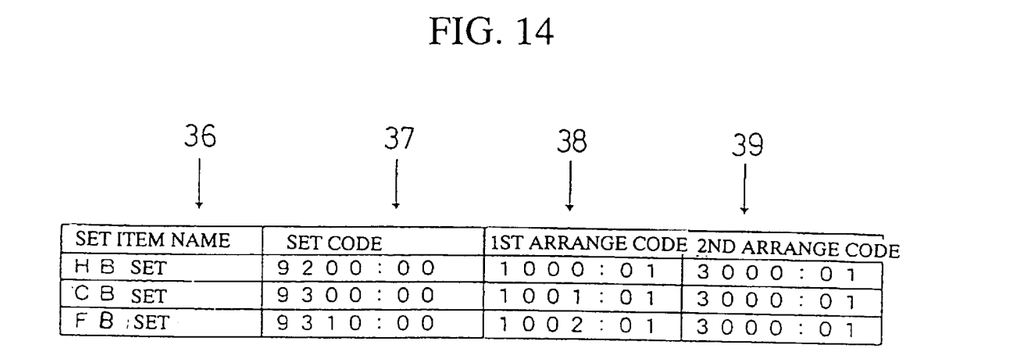
FIG. 14 is a view showing an item setting table in accordance with the fourth embodiment of the present invention.

FIG. 13 shows a display screen for the drive-through monitor 31 shown in FIG. 10 in accordance with a fourth embodiment of the present invention. FIG. 14 shows an item setting table in accordance with the fourth embodiment of the present invention. The item setting table of FIG. 14 includes a set name 36 displayed on the display screen or printed on a receipt, a set code 37, a first arrange code 38 representing an optional item constituting the set and a second arrange code 39 representing another optional item constituting the set. For example, FIG. 14 shows a "HB" set including a first arrange code (1000:01) which corresponds to the main code and the sub code of the "set hamburger" shown in FIG. 3. The "HB" set of FIG. 14 includes a second arrange code (3000:01) which corresponds to the main code and the sub code of the "set fried potato" shown in FIG. 3. Although the example of the item setting table shown in FIG. 14 includes two arrange codes, it is needless to say that the number and content of arrange codes can be changed flexibly.

Each set has a set code exceeding 9000 that is discriminable from the items shown in FIG. 3.

The fourth embodiment is applicable to the drive-through shop system shown in FIG. 10.

Operation of the fourth embodiment will be explained hereinafter. The customer in the vehicle 26 places an order for favorite ones from the listed items on the item indication board 25. The operator (i.e., order taker) registers the ordered items into the OT register 27. The data of the ordered items are sent from the OT register 27 to the controller 30 via the communication line 33. After finishing the order placing procedure, the customer advances his/her vehicle forward to the position indicated by the numeral 28.

A worker in the cooking room arranges the ordered items according to the drive-through monitor 31 connected to the controller 30. A plurality kinds of sets are prepared beforehand. For example, one set is prepared as a combination of a sandwich and a fried potato. The drive-through monitor 31 displays the ordered items by the set name or by the single item name according to the customer's order. This is easy for the worker to arrange the ordered items.

To administrate the ordered items, the controller 30 puts an order number to each order received from the OT register 27. The display screen of FIG. 13 indicates the contents of each order number. Single items are collected in the a same group #17 and discriminable from sets items #15 and #16.

Figure 15:
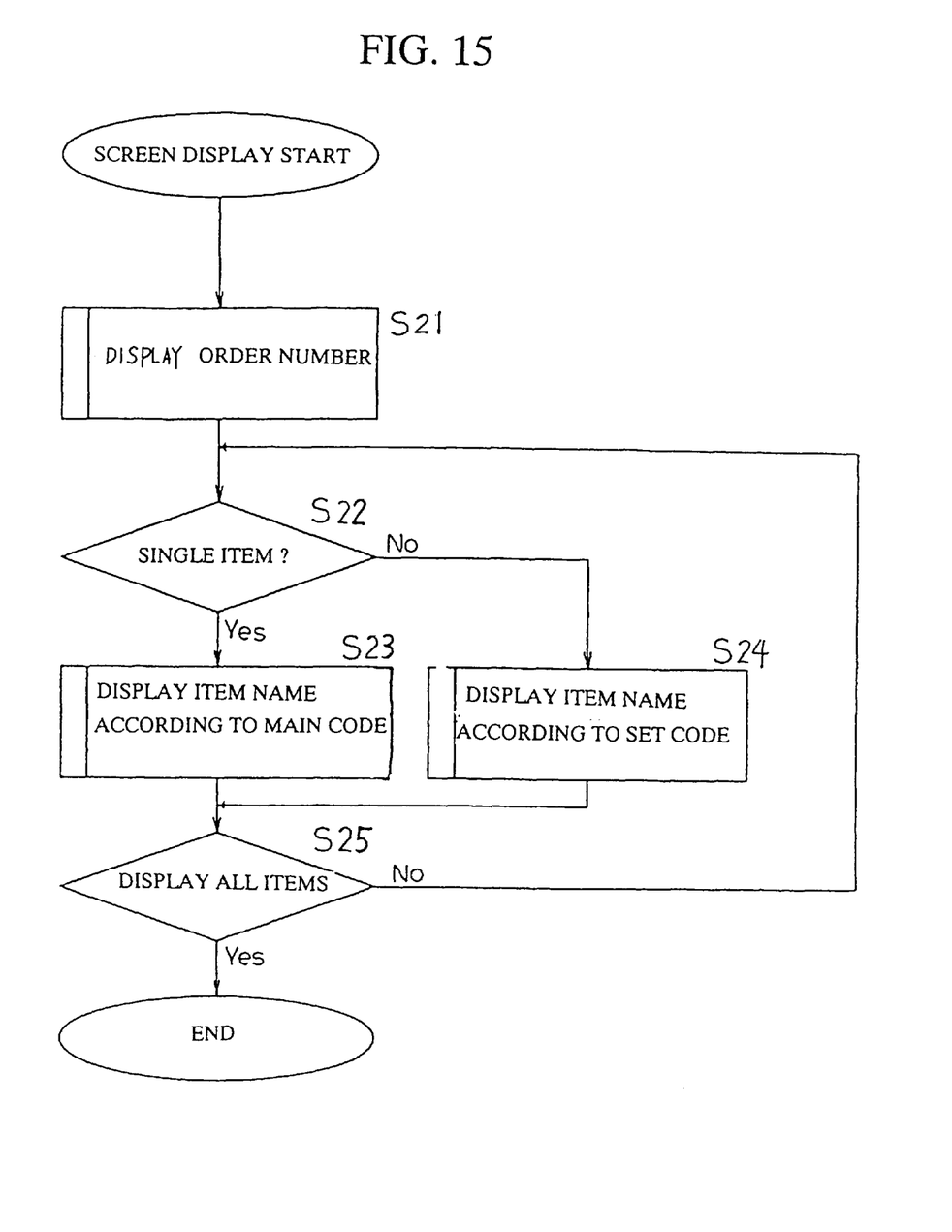
FIG. 15 is a flowchart showing a screen display routine performed by the electronic cash register in accordance with the fourth embodiment of the present invention.

FIG. 15 is a flowchart showing a screen display routine performed by the electronic cash register in accordance with the fourth embodiment of the present invention. In step S21, the controller 30 receives each order number and the drive-through monitor 31 displays the received order number. Then, in a step S22, it is checked whether the order number corresponds to a single item. When the judgement is YES is the step S22, the control flow proceeds to a step S23. In step S23, the ordered item is classified according to the main code 21 shown in FIG. 3. The drive-through monitor 31 displays the item name 20 together with a required number of each single item. When the judgement is NO is the step S22, the control flow proceeds to a step S24. In step S24, the ordered item is classified according to the set code 37 shown in FIG. 14. The drive-through monitor 31 displays the set name 36 together with a required number of each set. Finally, in step S25, it is checked whether all ordered items are displayed. If the registration (i.e., display operation) of the ordered items is competed, the screen display routine is finished. If there is any ordered item not displayed, the control flow returns to the step S22 to repeat the above-described procedure.

In this manner, the fourth embodiment uses different codes for facilitating the discrimination between the set items and the single items. The ordered items are displayed by the item name when the ordered item is a single item and by the set name when the ordered item is a set item. This facilitates the preparation and arrangement performed by a worker in the cooking room. This significantly reduces the time required for the preparation and arrangement for the ordered items.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An electronic cash register comprising:
    a storing means for storing an item setting table setting a main code and a sub code for each item, said main code identifying the name of said item and said sub code representing the price of said item which varies according to the way of sales;
    a judging means for judging whether or not a registration procedure is in a totaling stage; and
    a display means for changing the pattern of a display screen from a first classification to a second classification when the registration procedure is in the totaling stage based on the judgment result of said judging means.

2. The electronic cash register in accordance with claim 1, wherein said judging means judges said total stage of the registration procedure by checking an entry of a key operation for totaling registered items.

3. The electronic cash register in accordance with claim 2, wherein said key operation for totaling the registered items is a depression of a subtotal key or a total key.

4. The electronic cash register in accordance with claim 1, wherein said first classification includes ordered items discriminable based on both said main code and said sub code, and said second classification includes the ordered items discriminable based on said main code only.

5. An electronic cash register comprising:
    a storing means for storing an item setting table setting a main code and a sub code for each item, said main code identifying the name of said item and said sub code representing the price of said item which varies according to the way of sales;
    a judging means for judging whether or not a registration procedure is in a totaling stage;
    a correcting means for correcting a registered item; and
    a display mans for changing the pattern of a display screen from a first classification to a second classification when the registration procedure is in the totaling stage based on the judgment result of said judging means and for returning the display pattern from said second classification to said first classification in response to a correction performed by said correcting means.

6. The electronic cash register in accordance with claim 5, wherein said judging means judges said totaling stage of the registration procedure by checking an entry of a key operation for totaling registered items.

7. The electronic cash register in accordance with claim 6, wherein said key operation for totaling the registered items is a depression of a subtotal key or a total key.

8. The electronic cash register in accordance with claim 5, wherein said first classification includes ordered items discriminable based on both said main code and said sub code, and said second classification includes the ordered items discriminable based on said main code only.

9. An electronic cash register comprising:
    a first storing means for storing a single item setting table setting a main code and a sub code for each single item, said main code identifying the name of said item and said sub code representing the price of said item which varies according to the way of sales;
    a second storing means for storing a set item setting table setting a set code for each set item;
    a judging mans for judging whether an ordered item is a single item or a set item; and
    a display means for changing the pattern of a display screen from a first classification to a second classification different from said first classification when said ordered item is a set item based on the judgment result of said judging means.

10. The electronic cash register in accordance with claim 9, wherein said second classification includes ordered items discriminable based on said set code only.

* * * * *